Figure 1:
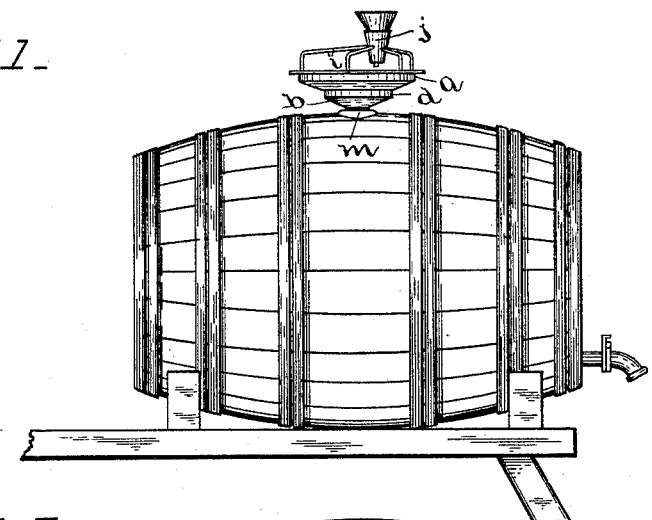

(No Model.) 2 Sheets—Sheet 1.

A. R. ABORN.
RACK FOR HOLDING AND DRAINING LIQUID MEASURES.

No. 483,664. Patented Oct. 4, 1892.

Witnesses
Alonzo M. Luther.
Lola D. Peale.

Inventor
Alonzo R. Aborn.
By his Attorney
Frank H. Allen (No Model.) 2 Sheets—Sheet 2.
A. R. ABORN.
RACK FOR HOLDING AND DRAINING LIQUID MEASURES.
No. 483,664. Patented Oct. 4, 1892.
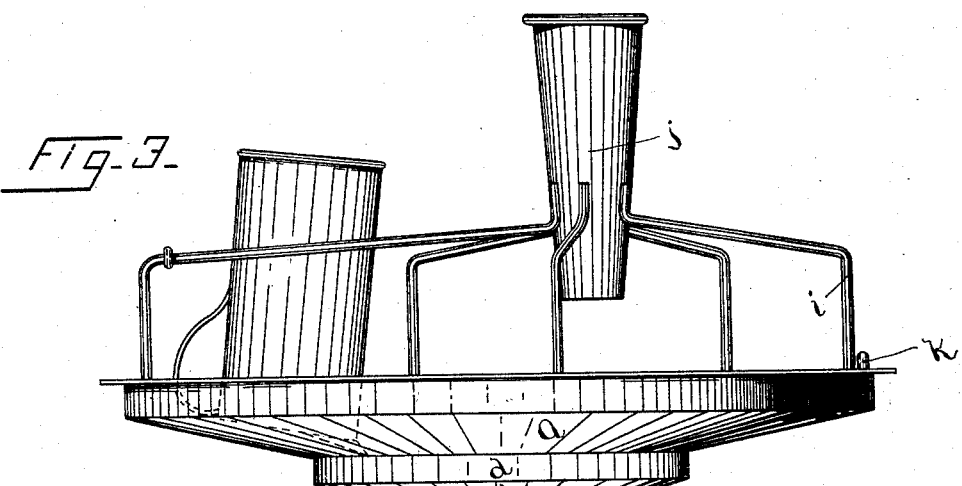
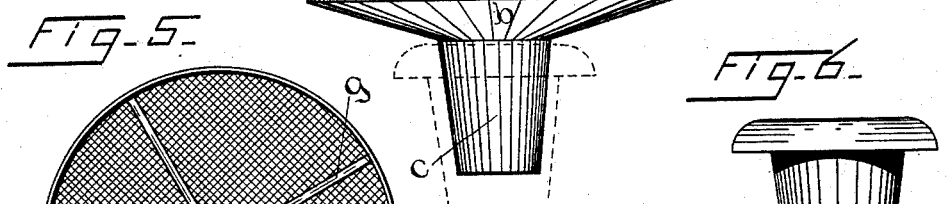
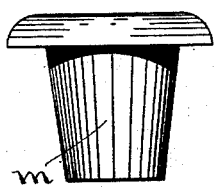
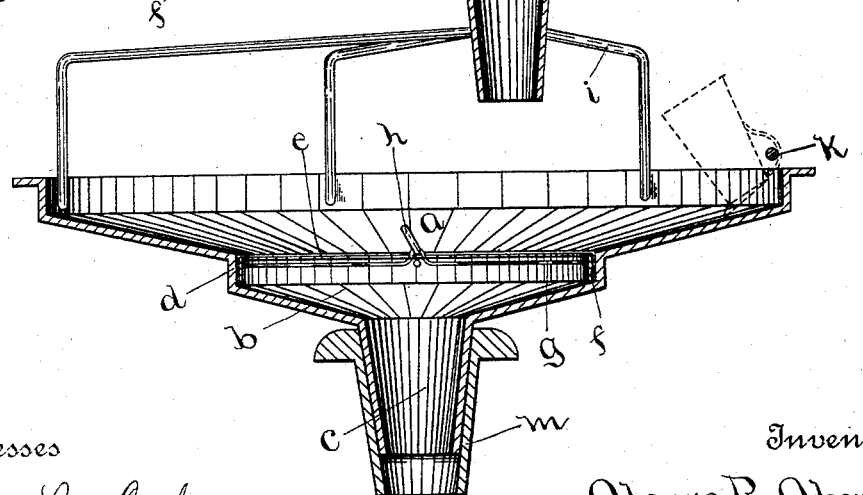
Witnesses
Alonzo M. Luther.
Lila D. Peale.
Inventor
Alonzo R. Aborn.
By his Attorney
Frank H. Allen.

UNITED STATES PATENT OFFICE.

ALONZO R. ABORN, OF NORWICH, CONNECTICUT.

RACK FOR HOLDING AND DRAINING LIQUID-MEASURES.

SPECIFICATION forming part of Letters Patent No. 483,664, dated October 4, 1892.

Application filed March 2, 1892. Serial No. 423,536. (No model.)

*To all whom it may concern:*

Be it known that I, ALONZO R. ABORN, a citizen of the United States, residing at Norwich, in the county of New London and State of Connecticut, have invented certain new and useful Improvements in Racks for Holding and Draining Liquid-Measures, which improvements are fully set forth and described in the following specification reference being had to the accompanying two sheets of drawings.

The hereinafter-described invention, although adapted for use with many different liquids, is especially desirable for the use of dealers in molasses, and throughout the following specification said invention is referred to as applied to that use.

It is generally known among retail grocers and like merchants that it is necessary in order to preserve untainted the purity of the finer grades of molasses and sirups to provide a separate set of measures and a separate funnel for each grade or quality which they may keep in stock. This is necessary for the reason that the molasses by reason of its viscous nature runs very slowly and it is seldom that time can be spared to allow the measure to fully drain after use before setting it away. In consequence a small portion of the molasses always remains in the measure and slowly settles to the bottom.

In order to illustrate the impracticability of using one set of measures with several grades of molasses, let us assume that a measure has been used as above described in connection with an inferior grade of molasses and that a small portion remains therein. It will be easily seen that should this measure now be used with molasses of a finer grade the inferior article remaining in the same will mix with and pollute in a greater or less degree the finer grade which may be drawn into the measure thereafter.

Where several grades or qualities of molasses are kept in stock it becomes necessary that many different measures be provided, which often become mixed, thereby causing much trouble and annoyance.

The object of my invention is to overcome the above-mentioned difficulties and to make both possible and practicable the use of one funnel and one set of measures with a reasonable number of different grades of molasses, and to this end I provide the following-described device, which is so constructed as to completely drain the measures and funnel after using, and which also provides a convenient receptacle on which the same may be kept while not in use.

Figure 2:
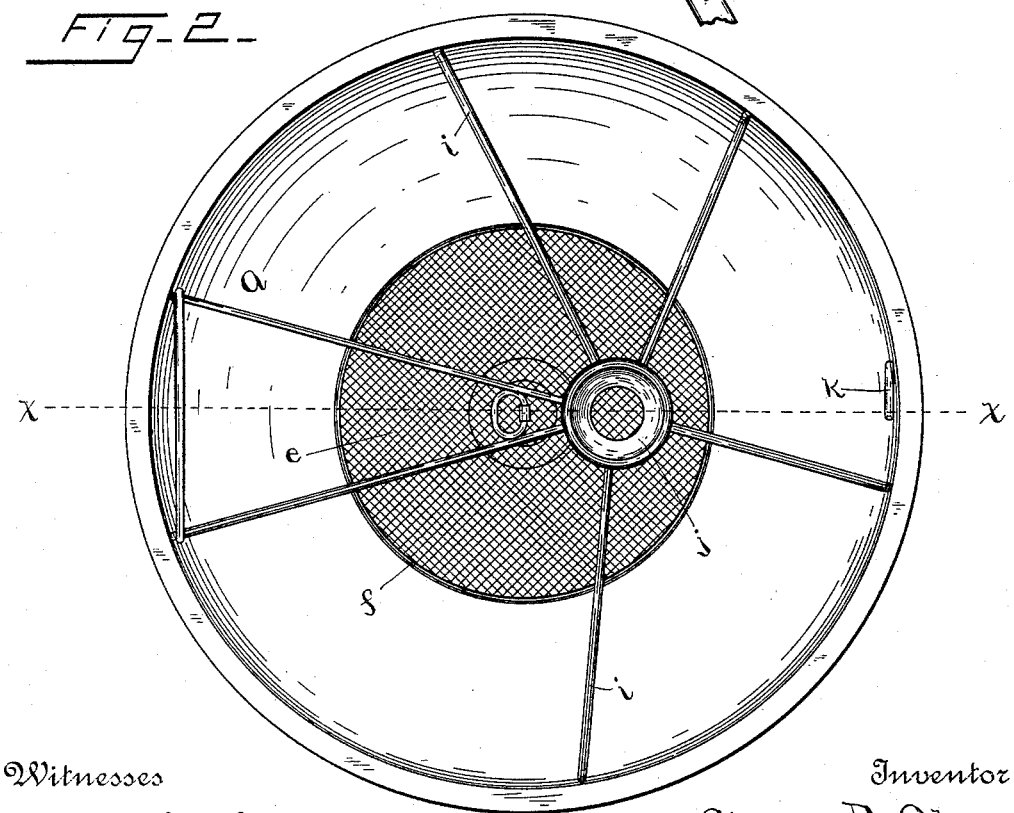

In the drawings, Figure 1 is a view of my complete rack, showing the same in place upon a barrel or hogshead of molasses as the rack appears when in use. Fig. 2 is an enlarged plan view of the rack. Fig. 3 is an elevation of the same and shows in place thereon a measure in the position necessary to drain. Fig. 4 is a cross-sectional view of the rack on line $xx$ of Fig. 2. Fig. 5 is an underside view of the strainer or sieve, through which all the drained molasses passes and is strained, as hereinafter explained. Fig. 6 is a view of a bushing which fits into the bung-hole of the barrel and which supports the complete rack.

My newly-invented rack or receptacle is formed substantially as two funnels, the larger or upper one of which being so constructed as to form a rack or receptacle for holding the measures and funnel when not in use, and which catches all drippings from any such vessels as may have been placed thereon, these drippings or drainings then passing from said larger or upper portion through a strainer into the lower portion or funnel of my invention, from which all accumulated stock passes downward through the neck of the complete device into a suitable receptacle below, (usually the hogshead.)

Referring to the drawings, the letter $a$ indicates the upper or larger portion or funnel of my complete device, and the letter $b$ the lower or smaller funnel. It will be seen by referring to the drawings that any liquid received into the upper part would naturally flow downward into the lower or smaller funnel, from where it would continue to flow downward and pass out through the neck $c$ of the device. I have provided what might be termed a "neck" $d$ for the larger funnel, in which neck I have placed a sieve or strainer $e$. All molasses passing from the upper to the lower portion of the device, as above explained, must necessarily pass through said strainer, thereby freeing the same from insects or any other impurities which it may have collected while exposed in the upper funnel. This sieve is constructed substantially in the shape of a tin-pail cover, the same being provided with a rim $f$, which is a snug fit inside the neck $d$, as seen in Fig. 4, across which rim is stretched a piece of wire-netting or other suitable strainer material. The sieve is greatly strengthened by two rods $g$, which pass approximately at right angles across the same, as seen in Fig. 5. On the opposite side of the screen from the described rods, at or near the center of the complete sieve, (the upper side when the same is in position,) is placed a ring $h$, suitably connected with the rods, and which forms a convenient handle by which the sieve may be readily removed for cleaning or other cause.

Supported somewhat above the funnel $a$ by wire rods $i$ is a slightly-tapering tube $j$. (See Figs. 1, 3, and 4.) This tube $j$ forms a receptacle to hold and drain a funnel after use, the same being placed in the tube, (see Fig. 1,) when any molasses remaining therein quickly drains into the upper portion $a$ of the device. It will be noticed by referring to Fig. 2 that the tube $j$ is offset somewhat from the center of the device and that the rods $i$, which support the same, are not disposed at equal distances around the circumference of $a$. This peculiar construction is provided in order that the spaces between the rods $i$ shall be of different sizes, as readily seen, in order that different sizes of measures may be placed on and drained into $a$, these measures being supported and held in position while thus draining by the said rods $i$, Fig. 3. Whenever it becomes necessary to use and drain measures of so small a size that the rods $i$ would not serve to hold and support them, the same are hung by their handle to a small right-angular upright $k$, which is suitably placed near the outer edge of $a$.

I preferably provide a tapering bushing $m$, which may be placed in the bung-hole of a barrel when the same is in the position shown in Fig. 1. This tapering bushing receives the neck $c$, Fig. 4.

The complete device is preferably placed upon a barrel of the poorest grade of molasses kept in stock, and after the measures have been used with any higher grade they are placed in their respective positions on $a$, from which they quickly drain down through the smaller funnel into the barrel, the molasses being strained through the screen.

While, as above explained, the poorer grades of molasses polute the better grades, these better grades draining into the poorer cannot but help to improve the latter.

After use the measures are properly placed upon my device, where they soon become thoroughly drained, so that the same may then be used with any other grade of molasses.

My device as a whole is not expensive to produce, avoids all waste of stock, and, as above set forth, avoids the necessity of providing different funnels and different measures for each grade of molasses that may be kept in stock.

Having described my invention, I claim—

1. In combination with a funnel-shaped receptacle with strainer, as set forth, a tubular funnel-support $j$, located eccentric to the said receptacle and supported by wires located at varying distances apart, as and for the purpose specified.

2. In combination with a funnel-shaped receptacle with strainer, as set forth, having a tubular funnel-support mounted on wires over said receptacle, a bushing $m$, adapted to receive and support the said receptacle, all being substantially as and for the purposes specified.

3. In combination with a funnel-shaped receptacle with strainer, as set forth, and a tubular funnel-support mounted thereon by wires, an angle-wire $k$, secured to the rim of said receptacle, substantially as and for the object specified.

ALONZO R. ABORN.

Witnesses:
FRANK H. ALLEN,
ALONZO M. LUTHER.